United States Patent Office.

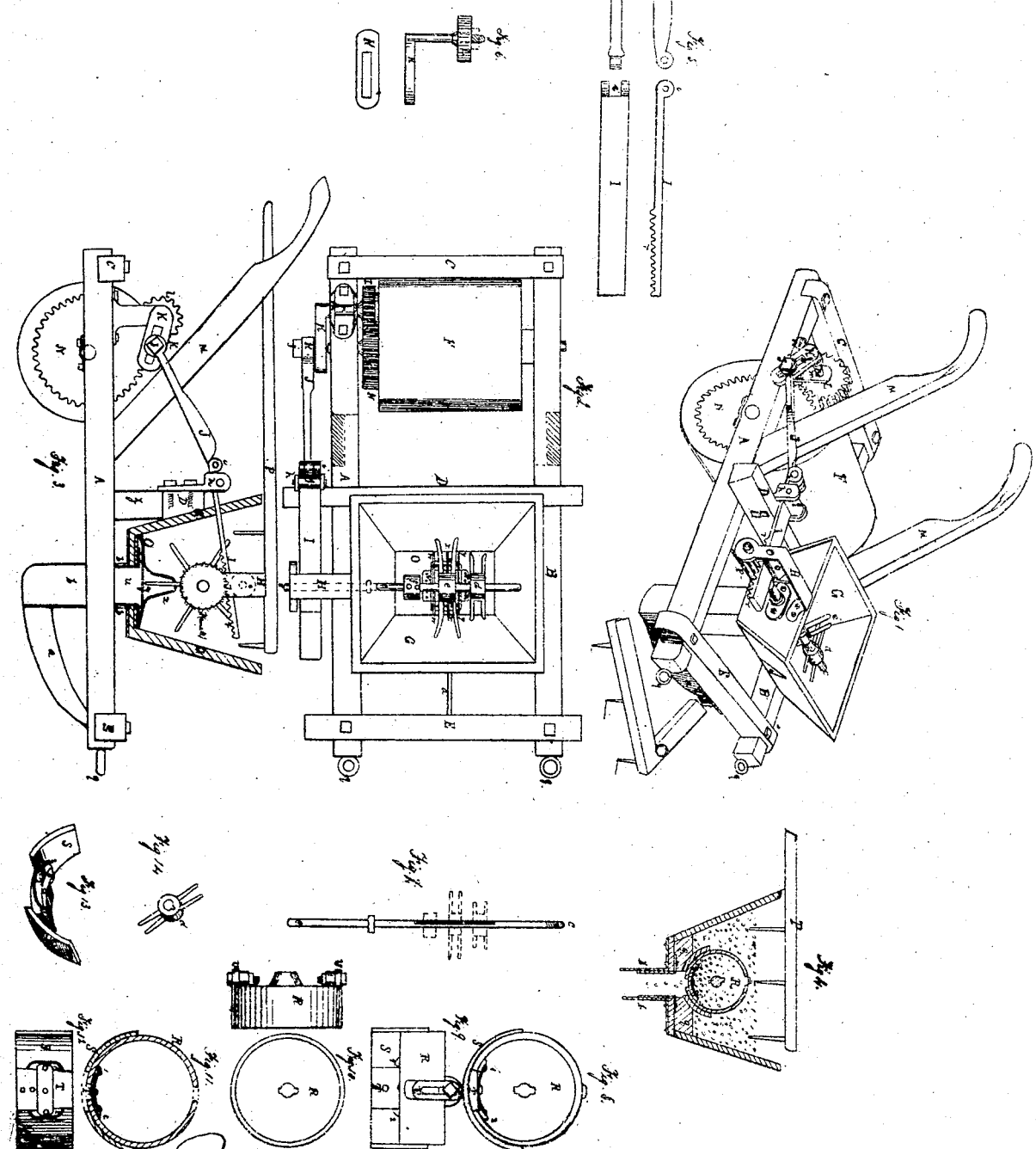
Runstetler & Windeck
Planting Cotton-Seed &c.
N° 75466 — Patented Mar. 10, 1868.
Witnesses
Edmund Thurlow
N. Baker
Andrew Runstetler
Albert Windeck

ANDREW RUNSTETLER AND ALBERT WINDECK, OF PEORIA, ILLINOIS.

*Letters Patent No. 75,466, dated March 10, 1868.*

IMPROVEMENT IN MACHINE FOR PLANTING COTTON-SEED AND CORN.

*The Schedule referred to in these Letters Patent and making part of the same.*

Be it known that we, ANDREW RUNSTETLER and ALBERT WINDECK, of the city and county of Peoria, and State of Illinois, have invented a new and useful Machine for Planting Cotton and Corn; and we do hereby declare that the following is a full, clear, and exact description of the construction and operation of the same, reference being had to the annexed drawings, making a part of this specification, in which—

Figure 1 is a perspective view,
Figure 2 a plan,
Figure 3, longitudinal elevation,
Figure 4, longitudinal section of hopper and corn-drill.
Figure 5, driving-rod and reciprocating slide.
Figure 6, crank and pinion,
Figure 7, shaft,
Figure 8, elevation of corn-drill.
Figure 9, bird's-eye view of same.
Figure 10, elevation and side view of corn-drill or cylinder.
Figure 11, transverse section of corn-drill complete.
Figure 12, bird's-eye view of "cut-off" portion.
Figure 13, perspective view of same.
Figure 14, perspective view of fork.

This machine consists of a frame, about four feet long by twenty inches wide, of two by three-inch wooden bars, two (A B) composing each side, and three (C D E) running crosswise, one at each end, and one across middle of frame, the end ones being firmly bolted; the middle bar being movable up and down, and holds the hopper. This frame is supported and carried by the roller or coverer F, of wood or metal, about eighteen inche in diameter by twelve and one-half inches long, situated between the rear cross-bars D C. This roller carries on its outer side a cogged metal wheel, N, about ten inches in diameter, which turns the pinion L, which is three and one-half inches in diameter, and is hung in the bearing or box $m$, and whose axle $n$ has on its outer end the crank K, with a slot in its arm, by which means the driving-rod J, about one foot long, works the reciprocating slide I either more or less in extent, by regulating same by means of bolt and nut $j$. The reciprocator I has cogs on its under side, at its forward end, and is about eighteen inches long by one and one-quarter wide, and five-sixteenths of an inch thick, and runs under the roller $g$, which is supported by the bearing $h$, and also between the roller $o$ and pinion $p$ in the box H, attached to outside of the hopper G. This roller $o$ is about one and one-quarter inch in diameter, and of same width as reciprocator or slide I. The pinion $p$ is also of same width, and about two inches in diameter, is fastened to the shaft $c$, running through side of hopper to a nut and washer on opposite side of same. This pinion conveys the motion from the reciprocator I to the shaft on which the forks $d\ e\ f$ are fastened. The shaft is about eighteen inches long by about five-eighths of an inch diameter. The arms of the forks $d\ e\ f$ are about five and one-half inches in extent, or from point to point, and are placed two inches apart, the centre one being over the hole in bottom of hopper, and those on each side are so arranged as to almost touch side and bottom of hopper over the box O with their points. The hopper G, which is about twenty inches across on the top, and nine inches at bottom, and sixteen inches from front to rear on top, by five and one-half inches at the bottom, is hung to the cross-bar D in the middle of machine. In the bottom of hopper is a hole of about two and three-quarter inches by two inches, opening into the shank $b$, of cast iron, and which shank is about eight inches in length, and same calibre as hole just described. The runner $a$ connects the shank with the forward cross-bar E, and is fastened thereto by bolts, &c. In the bottom of hopper, and made to fit it closely, is a box, of wood, O, (to be used when planting cotton with this machine,) having an opening or hole the same size as that below in bottom of hopper, and lined on its inner edge with tin ($v\ v\ v\ v$) or other smooth metal, and which lining extends down into the shank $b$ six inches. Across the hole or tin box run three or more wires, $w\ x\ y$, the centre wire, $x$, being bent at its middle upwards, so as to strike the cotton and seeds out of fork. The other wires, $w\ y$, are parallel with this one, and in the plane of the orbit of forks, and their distances can be regulated as required. The stirrer P, hung on the brace connecting the handles M M, projects over the hopper G, and having three teeth, each six inches long, by a lateral motion is used to clear the cotton from the forks and seed. The corn-drill, composed of the drill R and cut-off S, is placed upon shaft $c$ (after removing forks) when machine is required to drop corn. The drill R is a circular box of metal, six inches in diameter, and two and a quarter inches deep, and three-eighths of an inch thick, and slides on to shaft $c$ of hopper, and is fastened with set-screw. This drill R is provided with two slides for passage of corn, one on each side of its circumference, three inches each long by three-quarters of an inch wide. These slides move in slots or grooves, and are adjusted by bolts to lugs on back of cylinder. The half cylinder, called the cut-off, S, is also of iron or other metal, of same thickness as drill R, and which admits said drill or iron cylinder into it, and thus half enclosing same. It has on its lower side an opening, two inches in diameter, over which projects about the thickness of, and intended to admit, the drill R, an iron or tongue of metal, T, riveted at its base to the inner side of cut-off hole just described. On each side of the tongue are the two "cut-offs," properly so called, 1 2, connected by a spring, (flat,) riveted by its middle into centre of tongue, and at its two ends to each "cut-off," and is intended to press firmly against any corn that may happen to clog the free passage of that already in the slides of drill. For raising or lowering the runner, the support Z of the cross-bar D and hopper G, having a slot therein and bolt, is loosened and adjusted to suit. These are on the inside of frame. The V-shaped "harrow" in front of machine is attached to rear of shafts, behind horse, and is, each arm, about two feet long by about three inches square, and the whole harrow has five teeth or more.

The operation of this machine is as follows: On starting for field, the runner is raised from the ground by pressure on the handles M M; also the same plan is pursued when turning machine. If machine is required for planting corn, the forks $d\ e\ f$ are removed from the shaft $c$ by taking out the screws fastening the "pinion-box" H to side of hopper G; then sliding on to the shaft the corn-drill R, and fastening it, removing the box O, and inserting the wooden perforated block Q in its place, in which lies the "cut-off" S part of drill; then replace end of shaft and pinion-box. The corn being put into the hopper, the drill lets the seed into the shank twice in each revolution, and the harrow previously preparing the ground, the roller or coverer finishes the work.

For planting cotton, the box O is retained, as also the forks $d\ e\ f$. The seed is placed in the hopper until full, and is then raked by the stirrer P occasionally. The forks $d\ e\ f$, moved by the crank K and reciprocating slide I, make one revolution forwards and one backwards at each revolution of crank, and more than that still, if required, by lengthening the attachment at crank, or less motion by shortening same, &c. This reciprocating motion of forks thoroughly separates the threads about the seeds from the seeds, and with the assistance of the centre wire $x$ in the box O, which cleans the middle fork, and the side wires $w\ y$, which regulate the supply of seed to shank $b$, the seed is evenly distributed to the soil. The harrow above described, preceding the shank and runner, further promotes the admission of the seed to the soil, making a soft bed into which the seed is easily pressed by the coverer F, which it effectually buries.

What we claim as our invention, and desire to secure by Letters Patent, is—

1. In a convertible corn and cotton-planter, the movable metallic box O, having separating-wires $w$, $x$, and $y$, in combination with the revolving forks $d\ e\ f$, and the stirrer P, substantially as set forth.

2. The combination, in such a machine, of the perforated block Q, drill R, cut-off S, and tongue T, so constructed and arranged that they may be, alternately with the cotton-seeding mechanism, attached substantially as set forth.

3. The combination of the reciprocating cogged slide I, rollers $o\ g$, adjustable crank K, and driving-rod J, for communicating motion from the roller F to the seeding-mechanism of either the corn or cotton-planter, substantially as set forth.

4. The combination of the drill-teeth $b$, track-clearers $a$, and harrow $q$, arranged substantially as set forth.

ANDREW RUNSTETLER,
ALBERT WINDECK.

Witnesses:
E. THURLOW,
N. BAKER.